UNITED STATES PATENT OFFICE 2,073,018

PROCESS FOR THE TREATMENT OF LIGHT METALS AND THEIR ALLOYS

Henry Lepp, Cabourg, France, assignor to Compagnie Generale d'Electro-Metallurgie, Paris, France No Drawing. Application August 14, 1933, Serial No. 685,084. In Germany August 15, 1932

2 Claims. (Cl. 75—68)

It has already been attempted to remove impurities from light metals, particularly aluminium, magnesium and their alloys, by adding thereto purifying mixtures. It has also been proposed to incorporate in the molten substances chlorides, fluorides, carbides in the gaseous or solid condition. It has further been proposed to pass gases through them, such for example as carbonic acid, carbon monoxide, chlorine and so on, in order to obtain in this way elimination of the gases and of foreign metals.

The addition of oxidizing substances to the alloy has been proposed repeatedly and the purifying effect of permanganates, chromates and also potassium chlorate has been noted.

The subject of the invention is a new process of purifying light metals, particularly adapted for aluminium, magnesium, and their alloys. In this process there is obtained not only an excellent elimination of the gases, but also an increase in the mechanical properties of these alloys, probably by refining the texture.

This process is based on the selective oxidation of hydrogen, hydrocarbons and binary compounds of the metals under treatment with metalloids (carbides, sulphides, phosphides, nitrides, hydrides and others) by the use of an oxidizing agent appropriately chosen in each case to suit the metals or alloys to which it is applied. This result is obtained by taking care that before passing the oxidizing medium into the molten mass there is present therein a determined quantity of a substance acting as a reducing agent, and possessing at the fusion temperatures existing during operation a certain vapour tension: the reducing substance may be sodium or other alkaline metals, zinc, cadmium, sulphur or sulphurous acid. This substance may either be already present in the molten metal or in the molten alloy, for example as a constituent part of the alloy, or it may be introduced before the incorporation of the oxidizing medium, or at the same time. Its selection should be such that it does not have an unfavourable effect on the molten metal.

Thus the process according to the invention is characterized by this that particularly with a view to the elimination of gases from the molten mass the oxidizing treatment takes place only in the presence of a determined quantity of reducing substances which are at least partly volatile at the temperature of the molten mass, in such manner that after the oxidizing treatment there will still remain in said mass small quantities of said substances.

If, for example, the substance is introduced in the form of a chemical compound the other constituents of said compound should not form with the metal or one of the constituents of the molten alloy a combination insoluble in the metal or in the alloy, or unfavourably influence the properties of the finished product.

By introducing this reducing agent there is obtained by means of the additions of definite quantities of oxidizing media an equilibrium between the gases dissolved in the metal and the oxidizer.

Finally, it is necessary that there is a flux covering the molten mass which flux has for its object to scorify the nonvolatile products coming from the destruction of the impurities.

Principally, hydrogen and hydro-carbons may be considered as harmful impurities, and in particular as harmful gaseous components. These latter are not directly absorbed by the molten mass in the course of melting, but generally indirectly through chemical transformations, unless the reducing melt is carried out in a reducing atmosphere such as is obtained in a gas furnace.

Hydrogen is generally formed in accordance with the equation:

(1)  $H_2O + Me \rightleftarrows MeO + 2H$, where Me denotes a metal, and methane for example, is formed from metallic carbides according to the equation:

(2)  $2H_2O + MeC \rightleftarrows MeO_2 + CH_4$

In particular light metals such as aluminium and magnesium form in these cases oxides having an extraordinarily high fusion point and which cannot be practically reduced by hydrogen. The equilibrium of the equations given above is, in practice, completely broken in favour of the right hand side. If there is added to the liquid molten mass an extra amount of an oxidizing agent, one could hardly affect the equilibrium and the concentration of hydrogen; on the contrary the molten mass would merely be rendered more impure.

In consequence, if it is desired to eliminate from the molten mass in question the hydrogen or hydro-carbons it is necessary that there should be introduced into the alloy another element or a combination which at existing temperatures, that is to say in general at temperatures of fusion of the metals treated, increase the vapour tension of the bath and is more reactive than the principal constituent of the bath.

This substance to be introduced into the alloy should nevertheless have also a reducing effect because it ought to serve to transfer to the hydrogen the oxygen of the oxidizing agent employed. In this manner selective oxidation is obtained as above referred to which seems to proceed according to the following equations:

(3) $R + O \rightarrow RO_2$
(4) $2H + RO \rightleftarrows H_2O + R$ in which O is the oxygen content of an oxidizing agent and R a substance having reducing properties and being sufficiently volatile at the temperatures of the reactions.

In these equations the equilibrium according to the concentration of the substances acting as the oxidizing agent may be displaced up to certain limits so that elimination of the gases is produced. Choice of the substance serving to transport the oxygen should be made in such manner that there is obtained on the one hand reducing effects with respect to the oxidizing agent added and on the other hand oxidizing effects with regard to the impurities contained in the bath. The rules of physical chemistry and in particular the laws of equilibrium indicate means which are necessary for the choice of the substance taking into account at the same time the temperature and concentration.

In practice it is further necessary that the substance to be added which may be either an element or a sufficiently volatile combination should not have a harmful effect on the molten metal and should not give rise to harmful combinations in the course of the reactions which are produced.

However, the principal characteristic of the invention is that it is necessary that there should be present such a substance as above referred to at the moment at which the oxidizing agent comes into operation because otherwise the oxygen of the oxidizing agent would serve almost exclusively for the formation of oxides of aluminium or magnesium which are very difficultly reducible and have a high fusion point.

Finally it is desirable that the operation should take place in the presence of a flux having a low fusion point and which absorbs, although they are not themselves volatile at the fusion temperature, the combinations produced by the reactions or fixes them and prevents contact with moisture of the air.

With this process constituting the object of the invention, not only gases such as hydrogen and hydro-carbons may be eliminated but also other impurities such as carbides, sulphides, phosphides, nitrides, hydrides, and others by causing them to pass by means of the selective oxidation into the state of the corresponding oxide (the reactions are each absolutely analogous to those indicated in Equations 3 and 4 for the elimination of hydrogen) which is then separated from the molten mass and released or is fixed by the flux. The equations would be presented more or less as follows taking as an example elimination of carbon starting with a metal carbide:

(5) $MeC + RO \rightleftarrows Me + R + CO$
(6) $MeC + 2RO \rightleftarrows MeO + 2R + CO$ etc.

In these equations, Me is a metal such as aluminium, magnesium and so on, MeO refers to oxides such as $Al_2O_3$ having a high melting point and Me having great affinity for oxygen, R is a substance acting as transporter of oxygen, possessing at fusion temperatures a vapour tension and oxidizable on addition of the oxidizing medium.

I will explain by the aid of several examples the theoretical principles disclosed above. For example the treatment of an alloy of aluminium and silicon containing about 5 to 20% silicon was generally previously effected by the well known modification of texture realized by means of alkali metals, in particular sodium; for this purpose, sodium was added to the molten alloy either in metallic form or in the form of a combination. Nevertheless, it should be noted that the castings thus obtained would present to a certain extent fine cavities due to the presence in the molten mass of a large quantity of gas and this had an injurious effect in the production of castings of great value. According to this invention on the other hand the sodium acts as a reducing agent and, possessing at the same time at the temperature of fusion a vapour tension, it may serve as transporter of oxygen if a suitable oxidizing agent is present. The treatment of the alloy in fusion will then take place in accordance with the invention in such manner that one first adds to the molten mass sodium in the metallic form or in chemical combination and afterwards a suitable oxidizing agent together with a flux.

Among oxidizing agents may be mentioned alkaline chlorates, perchlorates, and oxychlorides, as well as chromates, bromates, iodates, perborates, permanganates, cyanates, nitrates and nitrites, manganese dioxide and other analogous bodies.

The sodium in this operation ensures the transport of oxygen and simultaneously by the modification of the texture, thus serving two purposes.

Apart from sodium, the other alkaline metals such as potassium, lithium, rubidium, caesium and also zinc and cadmium may in suitable quantities serve as transporters of oxygen.

By following the directions indicated above an alloy of aluminium and silicon has been melted having a silicon content of 13% to which has then been added 0.1 to 0.2% of metallic sodium. Mixtures of alkali chlorides and fluorides as also potassium chlorate and/or sodium chlorate have then been added. The optimum quantity of oxidizing agents added was of the order of 2% of the weight of the molten mass, for the mixture melted in a gas furnace, whereas the quantity of alkaline chlorides and fluorides added as fluxes amounted to about 1 to 5% of the weight of the molten mass.

It has been possible to reduce these quantities considerably by suitable mixtures and by lowering the melting point.

It should be observed in general that in the choice of the oxidizing agent and above all of the quantity to be added account should be taken of any possible preliminary treatment of the molten mass and of the determination of the equilibrium according to the rules of chemistry at high temperatures. It is known that every chemical reaction is a function of the concentration, of the temperature and of the duration; for example a notable difference results when the mass is melted in a crucible furnace or in an open oil furnace. The less gas contained in the molten mass at the start, and this depends principally on the mode of heating and the type of furnace employed, the smaller are the quantities of oxidizing agent necessary.

As a result of the treatment described it has in all cases been possible to observe that in alloys of aluminium and silicon all formation of blow-holes in the castings has been avoided.

The treatment in accordance with the process has been found particularly efficient for alloys of aluminium and silicon prepared by metallo-thermy which, as experience has shown, contain as impurities in addition to the quantity of gas normally present certain quantities of finely divided materials of the class of carbides, silicides and oxides. By taking into consideration the nature of these impurities, it will be possible in this case to work at higher temperatures and it would be necessary to select as oxidizing agent among the substances mentioned those which only commence to liberate their oxygen at high temperatures. As fluxes may be considered mixtures of chemical combinations of alkaline and alkaline-earth metals, such as carbonates, halogenated salts and also bases. The result of the treatment consists in the simultaneous elimination of the gases and of the impurities referred to in the form of slag. From this fact the quality of the castings both as regards their texture and their homogeneity is considerably improved.

The possibility of effective purification and elimination of the gases which the process described above offers presents certain particular advantages in the manufacture of castings of alloys having a high silicon content, that is to say those which precipitate normally "primary" crystals of silicon at the moment of solidification. "Primary" crystals of silicon are normally large and in the form of laminae. By reason of the great ease with which they break they influence very greatly the mechanical qualities of the alloy in question. In utilizing the process forming the object of the invention with or without simultaneous increase of the additions intended to render the grain finer a diminution of the size of the "primary" crystals of silicon is obtained which favourably affects the mechanical qualities, in particular the hardness of these alloys and in many cases constitutes the only means of obtaining castings of alloys having a high silicon content.

The above description for the treatment of aluminium and silicon alloys is suitable both for the treatment of other aluminium alloys, pure aluminium and also for the treatment of magnesium and of its alloys. It is necessary naturally in each case to pay particular attention to the choice of the transporter of oxygen. Thus for the treatment of magnesium there may also be employed sulphur or $SO_2$, these bodies having no harmful effect on this metal. For alloys of aluminium which contain zinc there may also be employed with advantage zinc or cadmium as transporter of oxygen. For alloys of aluminium containing copper there may also be employed as oxidizing agent oxides of copper or of manganese.

What is fundamental as a novel idea is the particular manner of the determination of the equilibrium according to which there is first introduced a reducing agent having a vapour tension and then only in its presence there is added the oxidizing agent, whereas previously all refining processes commenced by oxidation and terminated by reduction.

Having now particularly described and ascertained the nature of my said invention and in what manner the same is to be performed, I declare that what I claim is:

1. A process of purifying aluminum and magnesium and their alloys comprising adding to the molten metal a reducing agent capable of serving as a carrier of oxygen and being selected from the class composed of alkali metals, zinc, cadmium, sulfur and sulfurous acid; and then adding an oxidizer selected from the class composed of alkali chlorates, perchlorates, oxychlorides, bromates, iodates, perborates, permanganates, cyanates, nitrates and nitrites; and further adding a flux to the molten mass, the amount of reducing agent added being at least sufficient to protect the metal being treated from oxidation by the oxidizing agent added.

2. A process of purifying aluminum and magnesium and their alloys comprising adding to the molten metal a reducing agent capable of serving as a carrier of oxygen and being selected from the class composed of alkali metals, zinc, cadmium, sulfur and sulfurous acid; adding an oxidizer selected from the class composed of alkali chlorates, perchlorates, oxychlorides, bromates, iodates, perborates, permanganates, cyanates, nitrates and nitrites; and also adding a halide flux to the molten mass, the amount of reducing agent being at least sufficient to protect the metal being treated from oxidation by the oxidizing agent added.

HENRY LEPP.